Figure 1:
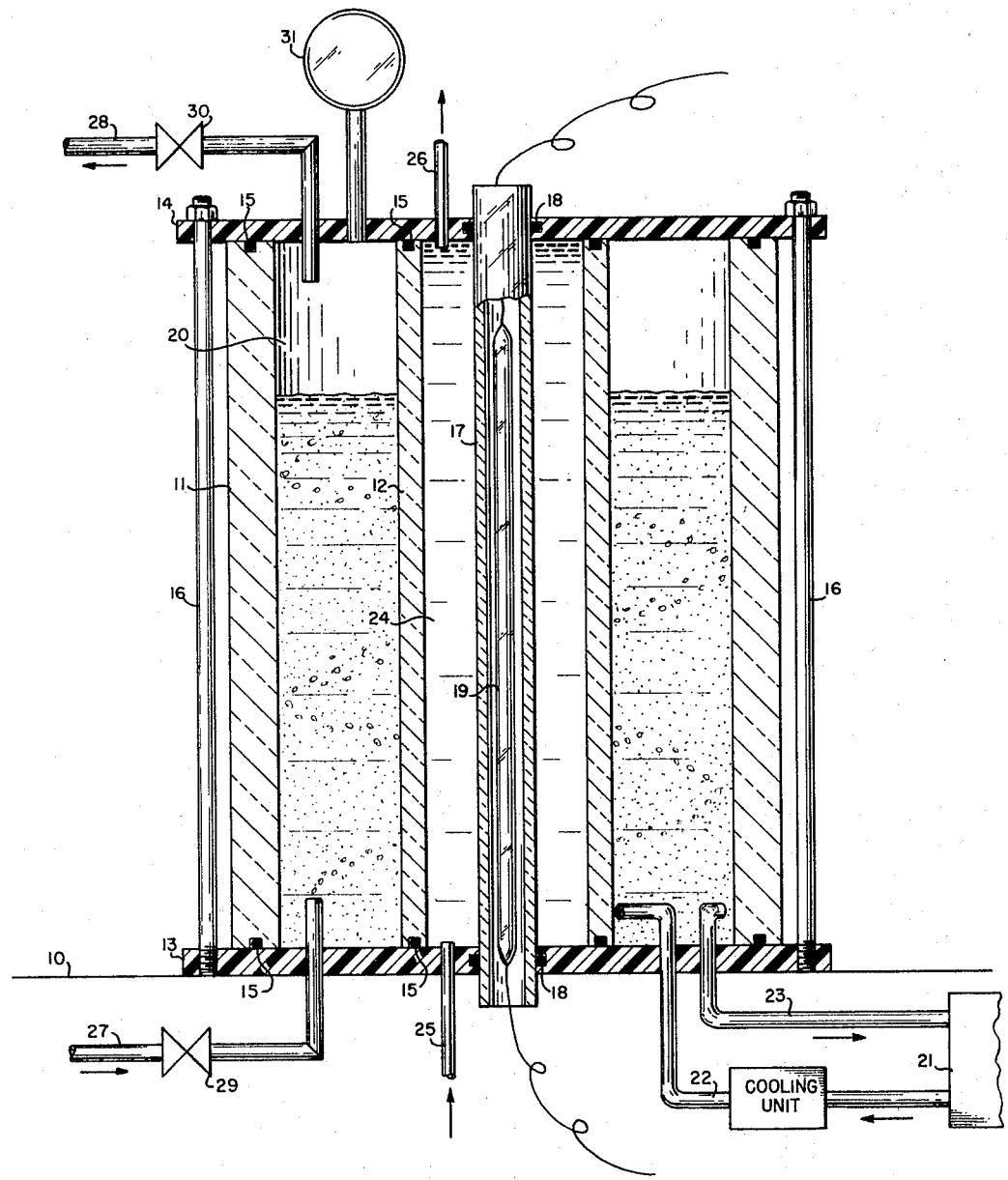

Feb. 14, 1967   P. J. HANNAN   3,303,608
OXYGEN PRODUCTION BY PHOTOSYNTHESIS OF ALGAE UNDER PRESSURE
Filed Sept. 2, 1965   2 Sheets-Sheet 1

INVENTOR
PATRICK J. HANNAN
BY Walter M. O'Brien
ATTORNEYS

United States Patent Office 3,303,608
Patented Feb. 14, 1967

3,303,608
OXYGEN PRODUCTION BY PHOTOSYNTHESIS
OF ALGAE UNDER PRESSURE
Patrick J. Hannan, Washington, D.C., assignor to the United States of America as represented by the Secretary of the Navy
Filed Sept. 2, 1965, Ser. No. 484,775
3 Claims. (Cl. 47—1.4)

The invention described herein may be manufactured and used by or for the Government of the United States of America for governmental purposes without the payment of any royalties thereon or therefor.

This invention relates to an improved method of producing oxygen by photosynthesis of algae.

One of the many problems associated with extended submarine and space voyages is providing the crew with oxygen. Since green plants use carbon dioxide, a waste product of man's respiration, and give off oxygen during photosynthesis, the development of a balanced ecological system aboard ship is an attractive solution. Photosynthesis by algae has attracted considerable interest for this purpose. However, the rate of production of oxygen by algae in photosynthesis at atmospheric pressure is unsatisfactorily low.

The present invention has as a principal object the provision of a method of conducting photosynthesis by algae in which oxygen is produced at an increased rate.

An earlier study of oxygen production in photosynthesis by algae, Hannan and Patouillet, Applied Microbiology, 11, 446 (1963), has shown that at a given light intensity, oxygen production is dependent upon the carbon dioxide input to the culture until the saturation rate of carbon dioxide for the culture has been reached, i.e., the maximum growth rate of the culture has been obtained. This relationship holds for an input gas which is an air-carbon dioxide mixture of a low carbon dioxide concentration, for example, of the order of from about 0.5 to 3.5% by volume carbon dioxide. Carbon dioxide input is measured as the product of the rate of flow of the air-carbon dioxide input gas and the concentration of carbon dioxide in the input gas. The saturation rate of carbon dioxide for an algal culture will vary with the intensity of irradiating light and can be determined in a known way.

An algal culture which provides a constant rate of oxygen production at a given light intensity, independent of the algal cell concentration, is in the linear phase of growth.

I have found that the rate of oxygen production by algal cultures which are in the linear phase of growth can be increased by raising the pressure on the cultures to about 10 p.s.i. above atmospheric and controlling rate of flow of the dilute carbon dioxide-air mixture to the cultures to provide a carbon dioxide input thereto which is less than the saturation rate for the cultures.

I have also found that when the pressure on the algal culture is increased to above 10 p.s.i. above atmospheric with saturation input rates of carbon dioxide to the culture, a progressive inhibiting of oxygen production occurs. For example, at 40 p.s.i., the oxygen production was found to have decreased by one-third after an hour and to have dropped to one-half of its original volume after two hours.

For a better understanding of the method of the invention reference is had to the description which follows and to the accompanying drawing in which:

FIGURE 1 is a diagrammatic view, partly in section, of an apparatus for carrying out the method of the invention.

Figure 2:
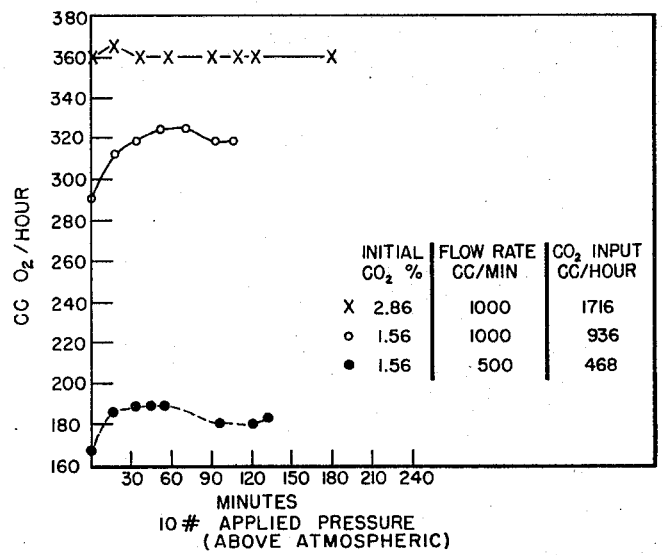
Figure 3:
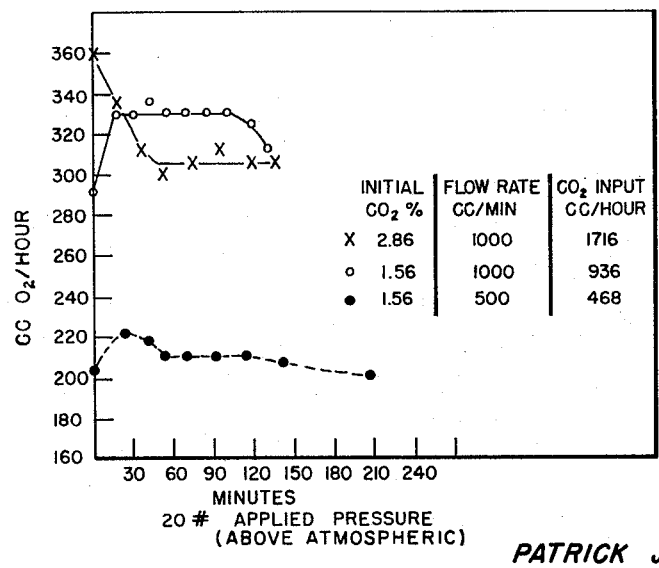

FIGURE 2 is a graph depicting rates of oxygen production by an algal culture under 10 pounds above atmospheric applied pressure thereon and with different carbon dioxide inputs thereto, and FIGURE 3 is a graph depicting rates of oxygen production by an algal culture with the same inputs of carbon dioxide to the culture as in FIGURE 1 but with an applied pressure of 20 pounds above atmospheric on the culture.

Referring to FIGURE 1 of the drawing the apparatus there shown rests upon a suitable support 10 and comprises an annular algal culture section which is under pressure, an annular lamp section for illumination of the algal culture, and an annular cooling water section between the lamp section and the algal culture section.

The algal culture section is defined by a pair of concentrically arranged sections 11 and 12 of thick-walled glass pipe which are seated at their ends in a pair of grooved transparent plastic blocks 13 and 14 of Lucite (polymethylmethacrylate) and held therein in liquid-tight relationship by means of rubber O-ring seals 15. The plastic blocks 13 and 14 are held in the assembled position by means of metal rods 16 which pass through the blocks and are threaded at each end, with nuts at the upper ends for locking the assembly.

The lamp section is defined by a thin-walled glass tube 17 which extends through circular openings in the transparent plastic blocks 13 and 14 and beyond each of the blocks and is held in the circular openings by means of rubber O-ring seals 18. The water-cooling section is defined by the glass pipe section 12 and the glass tube 17. A high intensity incandescent lamp 19 is suspended in the protective glass tube 17 by means of the lead wires thereto which are arranged with one wire leading out at the top and the other leading out at the bottom of the tube 17. Suitably the lamp is suspended by taping the lead wires to the glass tube 17.

The algal culture is circulated in the outer annulus 20 by means of a centrifugal pump 21 by way of flexible stainless steel tubing 22 and 23, as indicated. The delivery tubing 22 has a curvilinear orifice which is arranged to deliver the algal culture in a tangential direction into the bottom of the annulus 20 so as to give a swirling motion to the culture. The return tubing 23 has a curvilinear receiving end portion which is arranged for pick up and return of the culture to the pump 21. The delivery tubing 22 passes through a cooling unit of any suitable design through which ice water is circulated for maintaining the culture at temperature, e.g., at 38° C., and in response to a themoregulator (not shown) in the culture.

The water for cooling of the lamp section is circulated through the inner annulus 24 by means of delivery tubing 25, which enters through the plastic block 13, and the exit tubing 26 which passes through the plastic block 14 at the top. The tubing 25 and 26 are secured in liquid-tight relationship with the respective plastic blocks.

The air-carbon dioxide mixture, which is the input gas, is delivered from a pressure cylinder to the culture chamber 20 through a flowmeter (not shown) and a flexible metal delivery tube 27 which extends through the plastic block 13 and has its orifice in the bottom of the culture chamber 20. The effluent gas leaves the culture chamber 20 by way of the flexible metal tube 28 which extends through the plastic block 14. The tubes 27 and 28 are secured to the respective plastic blocks in gas-tight relationship therewith. Valves 29 and 30 are provided on the metal tubes 27 and 28, respectively. A pressure gauge 31 is arranged in gas communication with the space above the algal culture in the chamber 20. By manipulation of the valve 29 which regulates the rate of supply of the air-carbon dioxide mixture to the chamber 20 and of the valve 30 which controls the rate of exit of the effluent gas from the chamber, the desired pressure can be established on the algal culture in the chamber 20.

Oxygen production by the method is computed as the product of the gas flow and the gain in oxygen content of the input gas. The gain in oxygen content may be determined by making a comparative measurement of the oxygen content of the input gas before and after it has passed through the algal culture; using gas samples which have been dried prior to passing into the oxygen analyzer.

The method of the invention for improving oxygen production by photosynthesis of algae is illustrated by its application to the alga, *Chlorella pyrenoidosa* 7–11–05 (Sorokin and Myers 1953). A suitable culture medium for this alga has as major constituents: $MgSO_4 7H_2O$, 5 g.; $KH_2PO_4$, 2.5 g.; NaCl, 2 g.; urea 0.8 g.; and as micronutrients: sodium-iron-ethylenediamine-tetraacetic acid complex [Sequestrene NaFe (13%)], 4 mg.; $CaCl_2$, 22 mg.; $H_3BO_3$, 5.7 mg.; $ZnSO_4$, 0.44 mg.; $CuSO_4$, $5H_2O$, 0.158 mg.; $(NH_4)_6Mo_7O_{24}$, $5H_2O$, 0.035 mg.; $NaVO_3$, 2 mg.; and water to make 1000 ml. Tap water may be used instead of distilled water.

The alga, *C. pyrenoidosa*, was harvested from a large culture apparatus which was operated continuously under fixed conditions. A fresh suspension, 600 ml., was diluted with an equal volume of the fresh culture medium (above) to form the algal culture which was put into the culture chamber 20 of the above apparatus and circulated therein by means of the centrifugal pump.

In each run 1200 ml. of the algal culture (approximately 1% packed cell volume) were exposed to 11,000 footcandles (175 volts applied to the incandescent lamp 19), and an air-carbon dioxide mixture of approximately 2% $CO_2$ by volume, provided by an automatic system, was passed through the algal culture for approximately 75 minutes. The carbon dioxide input rate during this warm-up period was always greater than 1500 cc. $CO_2$/hour, the saturation carbon dioxide rate for the algal culture at the light intensity used. A pressure cylinder-dispensed air-carbon dioxide mixture was then substituted for the automatic system supply and several oxygen production determinations were made at predetermined flow rates and atmospheric pressure. After the oxygen production of the unit had been thus established, the pressure was increased by partially closing the valve 30 on the gas outlet 28 and adjusting the valve 29 on the gas inlet 27 to maintain the carbon dioxide input at the same rate under pressure as it was before pressure was applied. Analyses of the input gas for oxygen content before and after it passed through the algal culture in the chamber 20 were made at approximately 15 minute intervals over the duration of the runs. The algal suspensions grown with the culture medium during the runs had a pH of 5.3 to 5.5 and were maintained at about 36 to 38° C.

Air-carbon dioxide mixtures containing different amounts of $CO_2$ were passed through the algal culture in the chamber 20 at flow rates between 500 to 1000 cc./hour to provide carbon dioxide input rates of 1716, 936 and 468 cc./hour. The carbon dioxide content of the gas mixture from each pressure cylinder used was determined to within 0.02% by volume by an enhanced sensitivity Haldane apparatus.

The graph of FIGURE 2 depicts the data obtained when the oxygen producing runs were carried out at 10 pounds above atmospheric (10 p.s.i.).

The graph of FIG. 3 depicts the data obtained when the oxygen producing runs were carried out at 20 pounds above atmospheric (20 p.s.i.).

The first point on the curves in these graphs (on the ordinate axis) denotes the oxygen production when the culture chamber was operated at atmospheric pressure and the succeeding points thereon show the oxygen production with time under the applied pressure on the culture in the chamber. The data from the runs show: (1) that at the lower flow rates of carbon dioxide (less than saturation rates) and 10 lbs. above atmospheric applied pressure on the culture there was an increase in oxygen production and (2) at the highest flow rate, when the algal culture was carbon dioxide saturated, applied pressures of above 10 lbs. above atmospheric on the culture progressively inhibited oxygen production.

While the invention has been described herein with reference to certain specific embodiments thereof, the same is intended by way of illustration and not in limitation except as may be defined in the appended claims.

What is claimed and desired to be secured by Letters Patent of the United States is:

1. A method of producing oxygen in photosynthesis by algae which comprises subjecting an algal culture in the linear phase of growth to an applied pressure of up to about 10 p.s.i. above atmospheric while passing an air-carbon dioxide mixture of low carbon dioxide concentration through said culture at an input rate which is less than the saturation carbon dioxide rate therefor.

2. A method as defined in claim 1, wherein the air-carbon dioxide mixture passed through said algal culture contains from about 0.5 to 3.6% carbon dioxide by volume.

3. A method as defined in claim 1, wherein the alga of the culture is *Chlorella pyrenoidosa*.

No references cited.

ABRAHAM G. STONE, *Primary Examiner.*

ROBERT E. BAGWILL, *Examiner.*